Figure 11:
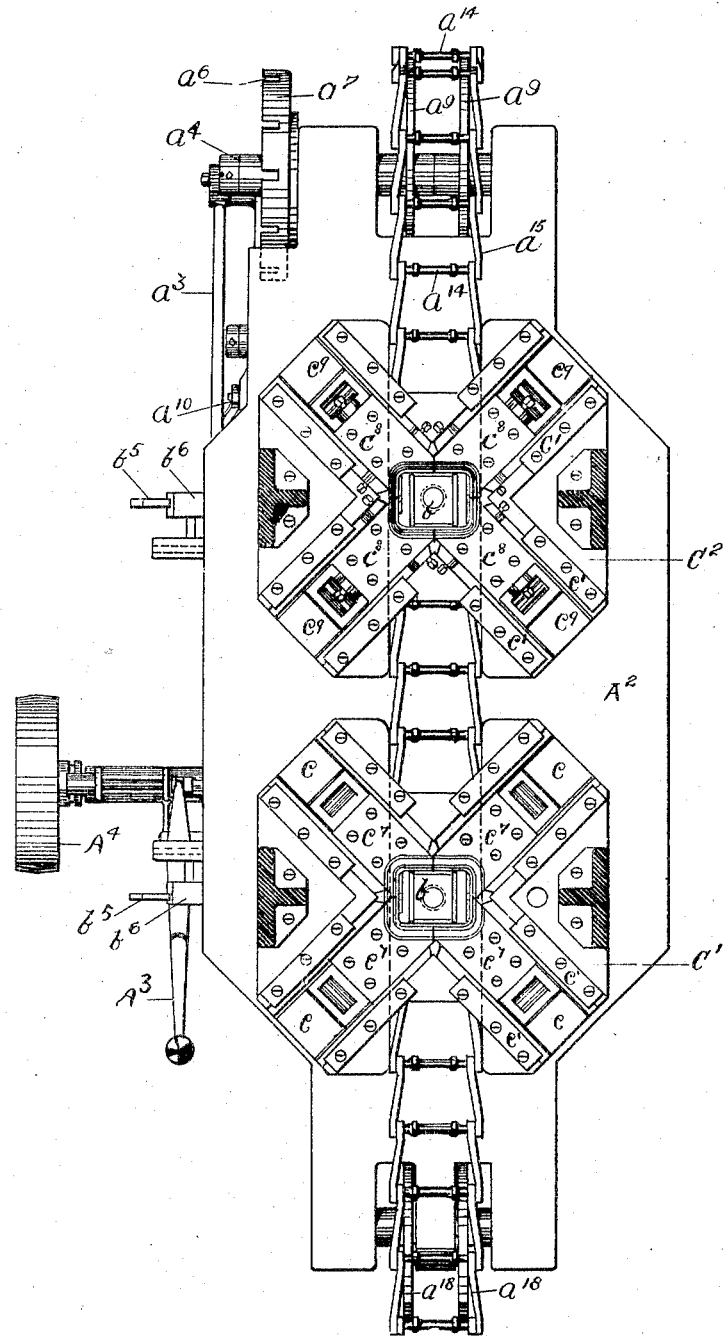

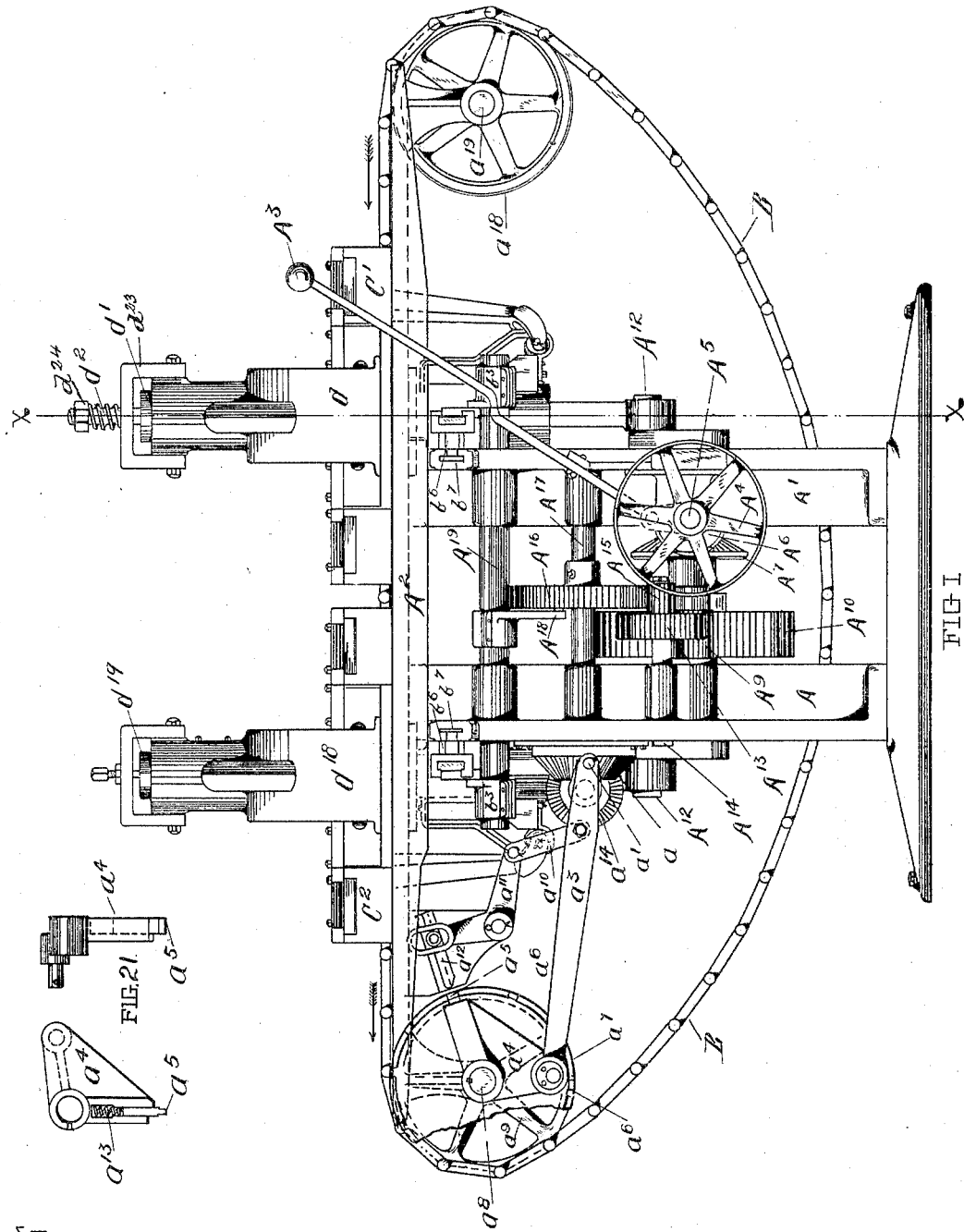

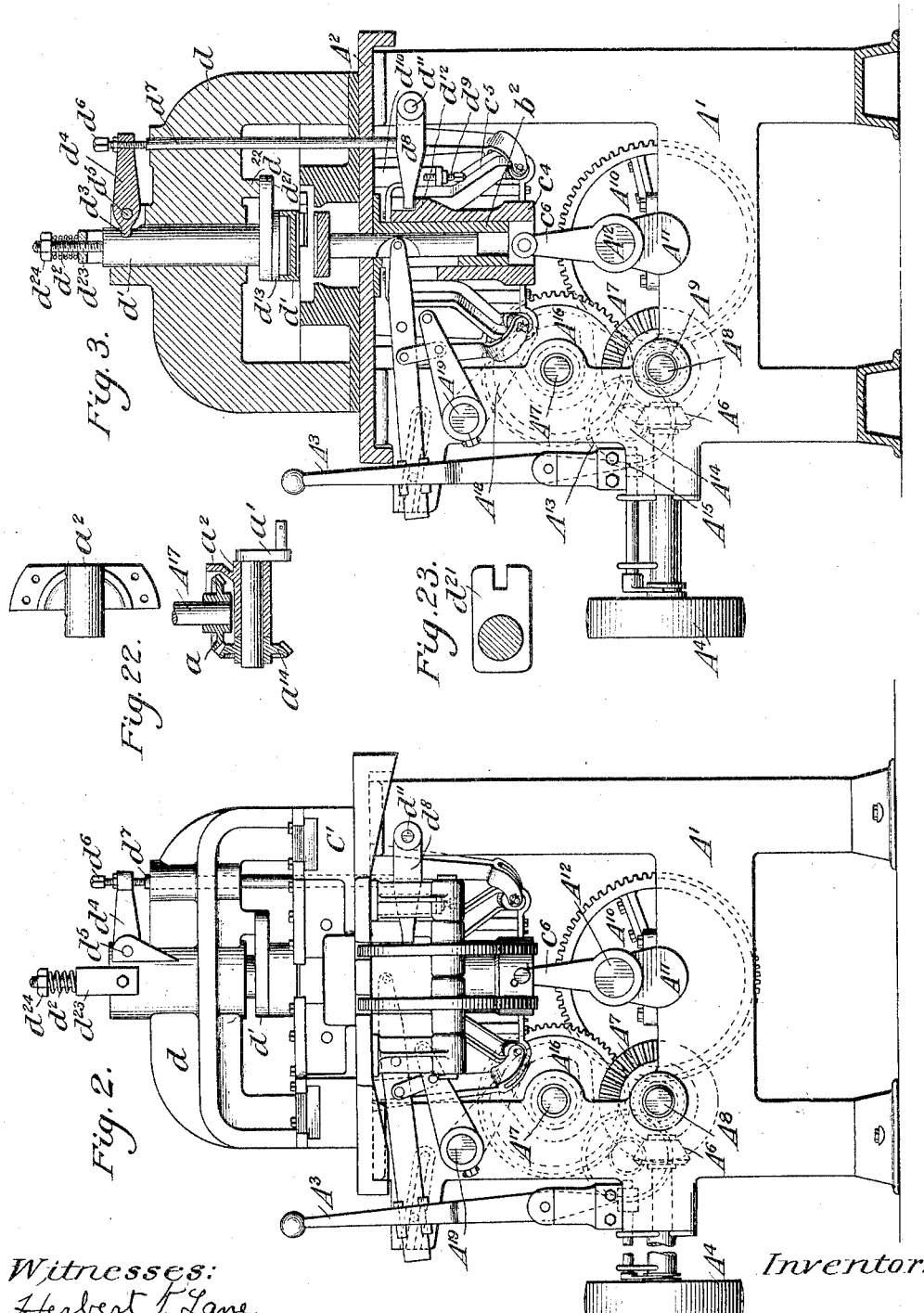

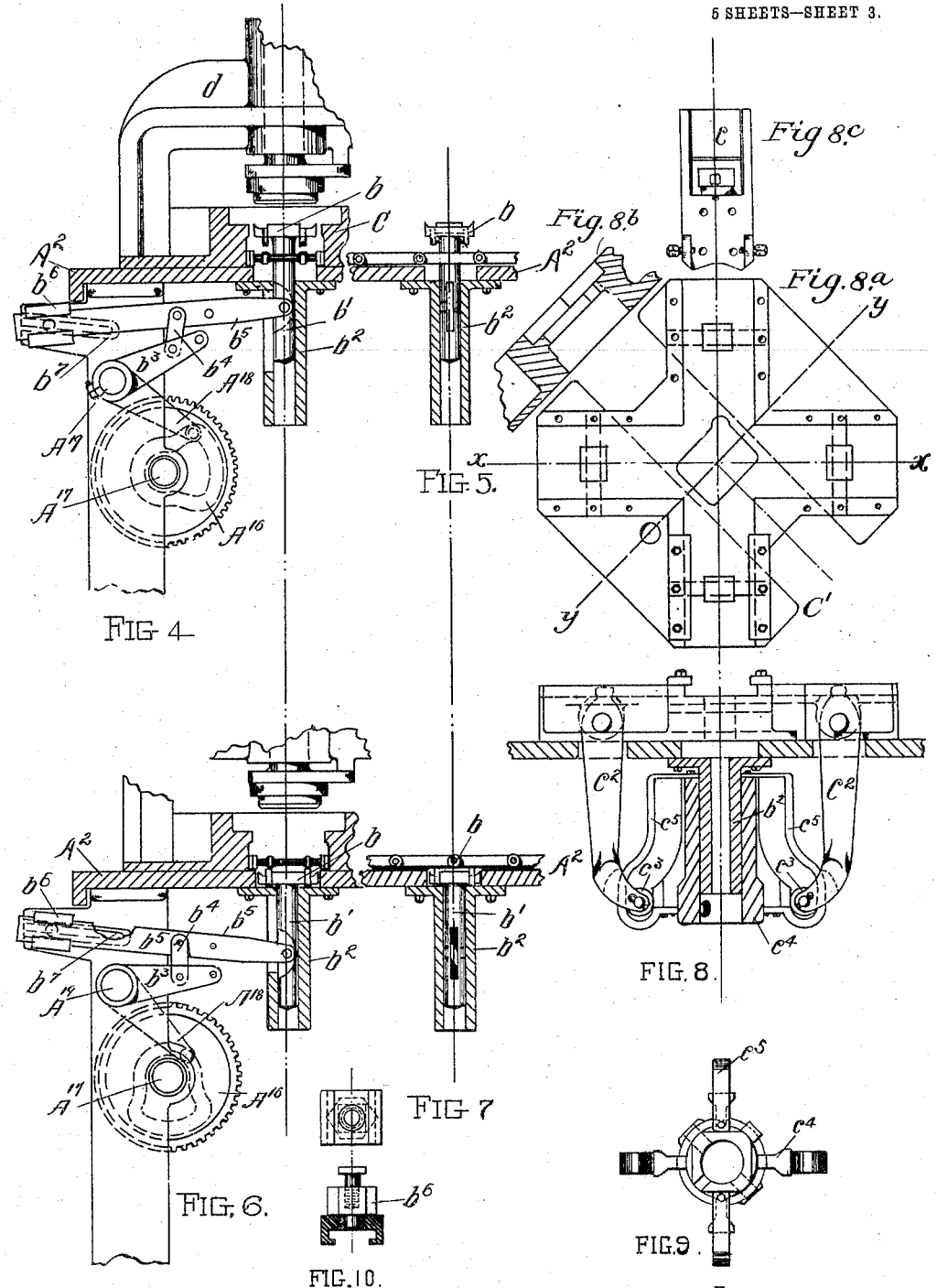

No. 784,012. PATENTED FEB. 28, 1905.
C. W. SLEEPER.
DOUBLE SEAMING MACHINE.
APPLICATION FILED JULY 11, 1902. RENEWED MAR. 4, 1904.
5 SHEETS—SHEET 5.
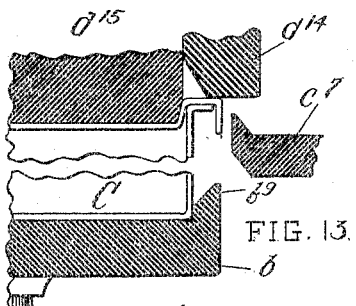
FIG. 13.
FIG. 14.
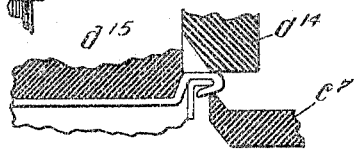
FIG. 15.
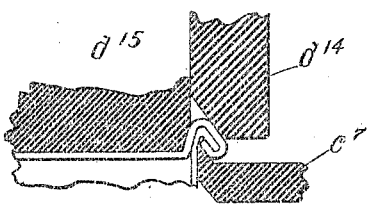
FIG. 16.
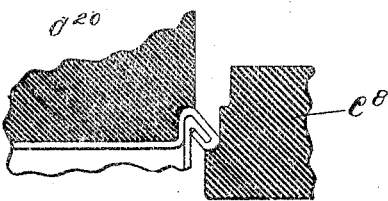
FIG. 17.
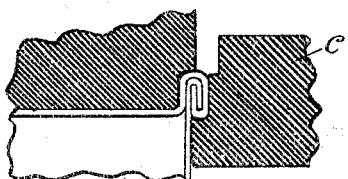
FIG. 19.
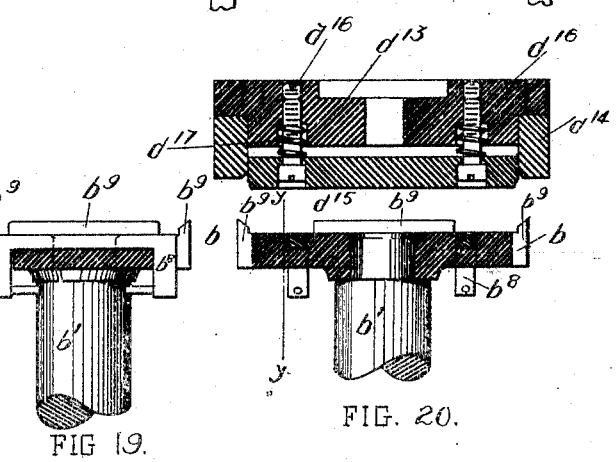
FIG. 12.
FIG. 18.
FIG. 20.
WITNESSES
Fred W. Cotton
Waterman E. Williams
INVENTOR
Charles W. Sleeper
by his atty.
Chas W Reed No. 784,012. Patented February 28, 1905.

UNITED STATES PATENT OFFICE.

CHARLES W. SLEEPER, OF LANCASTER, NEW HAMPSHIRE, ASSIGNOR, BY MESNE ASSIGNMENTS, TO AMERICAN KEY CAN COMPANY, OF CHICAGO, ILLINOIS, A CORPORATION OF NEW JERSEY.

DOUBLE-SEAMING MACHINE.

SPECIFICATION forming part of Letters Patent No. 784,012, dated February 28, 1905.

Application filed July 11, 1902. Renewed March 4, 1904. Serial No. 196,490.

*To all whom it may concern:*

Be it known that I, CHARLES W. SLEEPER, a subject of His Majesty the King of Great Britain, and a resident of Lancaster, in the county of Coos and State of New Hampshire, have invented certain new and useful Improvements in Double-Seaming Machines, of which the following is a specification.

My invention relates to improvements in machines for double-seaming the covers upon that class of tin cans in which the end of the can-body has an outwardly-projecting flange at right angles to the body and the can-cover is made with a central depression fitting into the can-body and a downwardly-projecting flange fitting loosely over the flange of the can-body.

The process of double-seaming consists in tucking the downwardly-projecting edge of the can-cover under the flange of the can-body, thus locking them together, then bending the flange of the can-body, together with the interlocking edge of the cover, downward and inward against the side of the can-body, and pressing the interlocking edges firmly together.

The machine is shown and described as adapted to the double-seaming of the covers upon the so-called "square" cans. It will be understood, however, that the machine is adaptable to round, oval, and other forms of cans by changing the outline of the dies and the guiding-points of the feed-chain.

In the accompanying drawings, Figure 1 is a side elevation of my invention. Fig. 2 is an end elevation with chain removed. Fig. 3 is a transverse section taken on a line X X, Fig. 1. Figs. 4, 5, 6, 7 are details showing the can-holder and its operating parts in section. Fig. 8 is a front view, partly in elevation and partly in section, of a portion of chuck C' and the operating parts connected therewith, taken on the line $x$ $x$ of Fig. $8^a$. Fig. $8^a$ is a plan view of chuck C'. Fig. $8^b$ is a section of the body of the chuck C', taken on the line $y$ $y$ of Fig. $8^a$. Fig. $8^c$ is a plan view of one of the jaws $c$. Fig. 9 is a top view of quadruple cam. Fig. 10 is a detail showing the swivel-nut $b^6$. Fig. 11 is a top view of machine with yokes cut away to show the chucks. Fig. 12 is a section of can and cover before the operation of double-seaming. Figs. 13, 14, 15, 16, and 17 are details showing the dies, can, and cover in different stages of the operation of double-seaming. Fig. 18 is a top view of a portion of the conveyer-chain and can-holder. Fig. 19 is a sectional detail of can-holder, taken on line $y$ $y$, Fig. 20. Fig. 20 is a central longitudinal section of can-holder and drawing-die. Fig. 21 is a detail of pawl-carrying arm. Fig. 22 is a sectional detail of feed-crank and gears. Fig. 23 is a plan view of the guide-plate $d^{21}$.

Referring to Figs. 1, 2, 3, and 11, A A' are the uprights for the frame of the machine, provided with suitable journal-boxes for the several shafts. $A^2$ is a table secured to the uprights A A'. To the uprights A A' and table $A^2$ are secured by suitable bolts and screws the various working parts of the machine.

The hand-lever $A^3$ operates a friction-clutch which receives the power from the driving-pulley $A^4$ and transmits it to the shaft $A^5$, which carries a bevel-pinion $A^6$, engaging a bevel-gear $A^7$ upon a shaft $A^8$. The shaft $A^8$ carries a spur-pinion $A^9$, which engages a gear $A^{10}$ upon the crank-shaft $A^{11}$, which carries two cranks $A^{12}$ $A^{12}$. The pinion $A^9$ also engages a gear $A^{13}$ upon a shoulder-stud $A^{14}$. A spur-pinion $A^{15}$ is made fast to the gear $A^{13}$ and engages a gear $A^{16}$ upon a shaft $A^{17}$.

The gear $A^{16}$ has a cam-groove cut in one side, which engages a pin with roller (not shown) upon the side of the arm $A^{18}$ and gives an oscillating motion to the rock-shaft $A^{19}$, to which the arm $A^{18}$ is secured.

Upon the end of the shaft $A^{17}$, Figs. 1 and 22, is a miter-gear $a$, engaging a similar gear $a^{14}$ upon a crank-shaft $a'$, which is journaled in a suitable hanger $a^2$. A connecting-rod $a^3$ connects the crank on said shaft $a'$ with an oscillating arm $a^4$, carrying a pawl $a^5$. (See Figs. 1 and 21.)

The pawl $a^5$ engages suitable slots $a^6$ in the rim of an index-wheel $a^7$, Figs. 1 and 11, mounted upon a shaft $a^8$, to which are secured two sprocket-wheels $a^9$. A link $a^{10}$ connects the rod $a^3$ with a bell-crank arm $a^{11}$, which moves a latch $a^{12}$.

The latch $a^{12}$ enters the slots $a^6$ and remains in each slot during the half-revolution of the crank $a'$, entering the slot when the crank is at one extremity of its throw and leaving the slot when the crank is at the opposite extremity of its throw. When the latch $a^{12}$ enters the slot $a^6$, it pushes the pawl $a^5$ toward the shaft $a^8$, and as the arm $a^4$ moves the pawl slides along the inner face of the rim of the index-wheel $a^7$ until it reaches the next slot $a^6$ and is forced into the same by the spring $a^{13}$ at the instant that the latch $a^{12}$ is withdrawn and the pawl commences its return motion, carrying the index-wheel with it. As the parts operate continuously, the index-wheel is moved a distance equal to the space between the slots $a^6$ during the one-half revolution of the crank $a'$ and held stationary during an equal period of time.

The sprocket-wheels $a^9$ are of suitable shape to engage the pins $a^{14}$ of the feed-chain, and each motion of the index-wheel is equal to one link of the chain.

The feed-chain B is best shown in Fig. 18 and is composed of pins $a^{14}$ and links $a^{15}$ and is designed to hold the can C loosely between the collars $a^{16}$ on the pins and the projections $a^{17}$ on the inside of the links.

The chain passes over idle wheels $a^{18}$ upon a shaft $a^{19}$, along the top of the table $A^2$, over the sprocket-wheels $a^9$, and returns beneath the frame of the machine. The can-holders $b$ $b$, of which there are two, Figs. 4, 5, 6, 7, 11, 18, 19, 20, are each provided with a spindle $b'$, which slides vertically in a flanged sleeve $b^2$, bolted to the under side of the table $A^2$, which is cut away at this point to allow the can-holder $b$ to sink down against the sleeve $b^2$. Each of the sleeves $b^2$ is so located that the can-holder $b$ shall be central between the links and pins of a section of the conveyer-chain, as at Fig. 18, when the chain is at rest. The holders $b$ $b$ are raised by the cam $A^{16}$, mounted upon the shaft $A^{17}$, acting, by means of the arm $A^{18}$ upon the rock-shaft $A^{19}$, to which are secured the arms $b^3$ $b^3$, each connected by a link $b^4$ to a rectangular lever $b^5$, one end of which passes through a slot in the sleeve $b^2$ and is pivoted in the spindle $b'$, the other end sliding in a slot in the revoluble head of an adjustable swivel-nut $b^6$, Fig. 10, the stationary portion of which is secured to the frame of the machine by a screw-bolt passing through a T-slot $b^7$ in the frame.

Fig. 4 shows the position of the parts when the can-holder $b$ is raised, and Fig. 6 shows the same with the can-holder $b$ at its lowest position, at which point the sides of the lever $b^5$ are parallel with the T-slot $b^7$, and the nut $b^6$ may be loosened and moved along the T-slot without changing the position of the can-holder. By moving the nut $b^6$, however, the working length of the lever $b^5$ is changed and the upward movement of the can-holder $b$ is adjusted.

Each can-holder $b$ is provided with upwardly-projecting spurs $b^9$, having their inner sides beveled to guide and retain the can C, as shown in Fig. 13. Each can-holder $b$ is also provided with two U-shaped steel guides $b^8$, Figs. 18, 19, 20, which rest in suitable grooves in the top of the can-holder when the same is raised. In the descending movement of the can-holder when the tops of the guides are on a level with the top of the table $A^2$ the legs of the guides rest upon the top of the sleeve $b^2$, and the further descent of the guides is thus prevented. The can-holder $b$, however, continues to descend until the spurs $b^9$ clear the can, which is thus left supported on the guides $b^8$ on a level with the top of the table $A^2$, the guides forming a bridge to support the can while moving across the recess in the table.

The chucks C' C², Fig. 11, are each provided with four sliding jaws $c$, held down by guides $c'$ and engaged by levers $c^2$, pivoted in the body of the chuck and forked at their lower ends to receive rollers $c^3$, which rest against the quadruple cam $c^4$, Figs. 3, 8, 9, and are held in place by the guides $c^5$. These guides consist of strips of metal attached to the cam $c^4$ at a distance therefrom sufficient to admit the rollers $c^3$ and curved to correspond with the faces of the cam opposite which they are placed, thus forming channels between the guides and the faces of the cam to hold and direct the rollers $c^3$ as they travel over the faces of the cam. The cam $c^4$ slides upon the sleeve $b^2$ and is connected to the crank $a^{12}$ by a connecting-rod $c^6$.

A revolution of the crank $a^{12}$ gives reciprocating motion to the cam $c^4$, which, acting through the levers $c^2$, causes the four jaws $c$ to alternately approach and recede from each other.

Upon each of the four jaws $c$ of the chuck C' is secured a die $c^7$, the inner edge of which projects upward, forming an angular ridge, one of whose faces is perpendicular and the other at an angle of about forty-five degrees therewith, as shown in Fig. 13, and the four dies when closed (moved toward the center of chuck) surround and fit closely to the outside of the can. Upon the four jaws $c^9$ of the chuck C² are secured four dies $c^8$, similar to $c^7$, but having their inner faces formed as in Fig. 16.

Referring particularly to Figs. 1, 2, 3, 4, $d$ is a yoke secured to the chuck C' and carrying a die-holder $d'$, consisting of a cylindrical shaft arranged to move vertically through said yoke $d$ and held up by means of a coiled spring $d^2$, resting upon a cross-yoke $d^{23}$, attached to the yoke $d$, and bearing against a nut $d^{24}$ upon the upper end of a rod projecting from the top of the die-holder $d'$. To the lower end of the die-holder $d'$ is attached the die-block $d^{13}$, as hereinafter described. In the side of the die-holder $d'$ is a rectangular notch $d^3$, engaged by a lever $d^4$, pivoted upon a pin $d^5$ in the yoke $d$.

An adjusting-screw $d^6$ through the end of the lever $d^4$ rests upon the top of a rod $d^7$, supported by the lever $d^8$, which in turn rests upon an adjusting-screw $d^9$ in a yoke $d^{10}$, and is pivoted at one end upon a stud $d^{11}$, projecting from the frame $A'$.

The inner end of the lever $d^8$ is at the proper time engaged and raised by a projection $d^{12}$ upon the side of the cam $c^4$, causing the die-holder $d'$ to descend, the amount of the motion being regulated by the screw $d^9$ and the position of the die-holder being adjusted by the screw $d^6$.

In order to prevent any turning of the die-holder $d'$ during its descent and to preserve the correct alinement of the dies, a guide-plate $d^{21}$ is attached to the die-holder $d'$, the outer end of which is forked and embraces a guide $d^{22}$, attached to the yoke $d$.

To the bottom of the die-holder $d'$ and in alinement with the dies $c^7$ is secured a die-block $d^{13}$, Fig. 20, which carries a drawing-ring $d^{14}$ and a yielding die $d^{15}$, which fits into the depression in the can-cover and is held to the die-block $d^{13}$ by screws $d^{16}$ and rests against springs $d^{17}$.

Upon the chuck $C^2$ is secured a yoke $d^{18}$, carrying a die-holder $d^{19}$, similar to $d'$, and adjustably secured in the yoke.

To the bottom of the die-holder $d^{19}$ is secured a die-block similar to $d^{13}$, carrying a rigid die $d^{20}$, Fig. 16, in alinement with the dies $c^8$ and accurately fitted to the depression in the can-cover.

In operation the can, with its cover loosely put on, is placed within a link of the feed-chain, with the bottom of the can resting upon the table. A few motions of the chain place the can over the can-holder $b$, underneath the chuck $C'$, where it rests upon the guides $b^8$. While the chain is at rest, the can-holder $b$ rises until it presses the can against the drawing-ring $d^{14}$ and die $d^{15}$, as shown in Fig. 13, when the dies $c^7$ close upon the can and bend the downward-projecting edge of the cover under the outwardly-projecting flange of the can-body. When the dies $c^7$ reach the position shown in Fig. 14, the drawing-ring $d^{14}$ begins to descend, drawing the interlocking edges of the cover and flange of the can over the point of the dies $c^7$, as shown in Fig. 15. The dies and drawing-ring then simultaneously withdraw. As the die $c^7$ withdraws its oblique face forces the seam upward, keeping it in contact with the drawing-ring, and thereby lifts the can slightly from the can-holder until the die is clear of the seam, when the can drops back into its place on the can-holder. The can-holder then descends with the can and leaves it resting upon the guides $b^8$ to be carried forward by further motions of the chain until it is directly over the die-holder beneath the chucks $C^2$, when the can is again raised until the cover presses against the die $d^{20}$, the dies $c^8$ close upon the depressed edge of the can-cover, as in Fig. 16, and press the interlocking edges firmly together, as in Fig. 17. The dies $c^8$ then withdraw, and the can again descends into the chain and is carried along to fall from the chain into a suitable receptacle.

What I claim, and desire to secure by Letters Patent, is—

1. In a machine of the class described, the combination of the following mechanisms, to wit: mechanism for engaging and holding the can and cover, reciprocating mechanism for engaging and folding the flange of the can-cover, mechanism for engaging and folding the can-body and can-cover flanges, mechanism for engaging and completing the folding of the can-body and cover-flanges, and mechanism connecting the above-named mechanisms to cause them to operate successively on the can and cover.

2. In a machine of the class described, the combination of the following mechanisms, to wit: mechanism for engaging and holding the can and cover, horizontally-reciprocating mechanism for engaging and folding the cover-flange, vertically-reciprocating mechanism for engaging and folding the can-body and can-cover flanges, horizontally-reciprocating mechanism for engaging and completing the folding of the two flanges, and mechanism connecting the above-named mechanisms to cause them to operate successively on the can and cover.

3. In a machine of the class described, the combination of the following mechanisms, to wit: mechanism for engaging and holding the can and cover, mechanism for engaging and folding the cover-flange, mechanism for engaging and folding the can-body flange and cover-flange, mechanism for moving the can from the said last-named mechanisms, mechanism for engaging and completing the fold of the two flanges, and mechanism connecting the above-named mechanisms to cause them to operate successively on the can and cover.

4. In a machine of the class described, the combination with mechanism for engaging and holding the can and cover, of horizontally-reciprocating dies adapted to engage and fold the depending cover-flange, mechanism for moving said dies, vertically-reciprocating mechanism adapted to engage and partially fold the interlocked can-body and cover-flanges, mechanism for moving the last-named mechanism vertically, and mechanism connecting the above-named mechanisms to cause them to operate successively on the can and cover.

5. In a machine of the class described, the combination with a carrier mechanism adapted to engage and carry the can and cover, mechanism for engaging and holding the can and cover, horizontally-sliding reciprocating dies for engaging and folding the vertical depending cover-flange, and vertically-reciprocating mechanism for engaging and partially folding the interlocked can-body and cover-flanges.

6. In a machine of the class described, the combination with an intermittently-moving carrier adapted to engage and move the can and cover, mechanism for engaging and holding the can-cover during a cessation of movement of the carrier, horizontally-reciprocating mechanism for engaging and folding the cover-flange, vertically-reciprocating mechanism for engaging and partially folding the interlocked can-body and cover-flanges, mechanism for moving the can from said last-named mechanisms, mechanism for engaging and holding the can and cover after their movement from the former folding mechanism, and mechanism for completing the folding of the interlocked can-body and cover-flanges.

7. In a machine of the class described, the combination with an intermittently-moving carrier adapted to engage and move the can and cover, mechanism for engaging and holding the can-cover during a cessation of movement of the carrier, horizontally-reciprocating mechanism for engaging and folding the cover-flange, vertically-reciprocating mechanism for engaging and partially folding the interlocked can-body and cover-flanges, mechanism for moving the can from said last-named mechanisms, mechanism for engaging and holding the can and cover after their movement from the former folding mechanism, and horizontally-reciprocating mechanism for engaging and completing the folding of the interlocked flanges.

8. In a machine of the class specified the can-carrying chain B sprocket-wheels $a^9$ and slotted index-wheel $a^7$ with means for giving to said index-wheel intermittent rotary motion consisting of the oscillating arm $a^4$ spring-pawl $a^5$ connecting-rod $a^3$ and crank-shaft $a'$ with means for giving said crank-shaft oscillating motion, in combination with the link $a^{10}$ pivoted to the connecting-rod $a^3$, bell-crank arm $a^{11}$ and latch $a^{12}$ substantially as and for the purpose described.

9. In a machine of the class specified the can-holders $b\ b$, each provided with beveled spurs $b^9$, guides $b^8$, spindle $b'$ and means for raising and lowering said can-holders substantially as and for the purpose described.

10. In a machine of the class specified the can-holders $b\ b$ with means for raising and lowering the same consisting of levers $b^5$ pivoted to the spindles $b'$ of said can-holders and sliding in nuts $b^6$, arms $b^3$ and links $b^4$ connecting said arms $b^3$ with the levers $b^5$, rock-shaft $A^{19}$, cam-arm $A^{18}$ and cam $A^{16}$ for giving reciprocating motion to said levers $b^5$, with means for operating said cam substantially as described.

11. In a machine of the class specified the can-holders $b\ b$ provided with spindles $b'$ having levers $b^5$ pivoted thereto means for giving said levers vertical reciprocating motion, and means for regulating the extent of the upward movement of said levers $b^5$ consisting of the adjustable swivel-nuts $b^6$ sliding in T-slots $b^7$ in the frame of the machine substantially as described.

12. In a machine of the class specified the sliding jaws $c$ carrying dies $c^7$ and working in chuck $C'$ with means for forcing said jaws toward and from a common central point, in combination with die-block $d^{13}$, yielding die $d^{15}$ and drawing-ring $d^{14}$ operating in conjunction with said dies $c^7$ in the formation of the seam, means for supporting the can during the operation of double-seaming and means for moving said die-block $d^{13}$ vertically to and from said can-supporting mechanism substantially as described.

13. In a machine of the class specified, a yielding die $d^{15}$ adapted to fit into the cover of a can, and a drawing-ring $d^{14}$ surrounding said yielding die and having its lower inner edge beveled at an angle of about forty-five degrees both mounted upon the die-block $d^{13}$, in combination with dies $c^7$, terminating in an upwardly-projecting triangular ridge whose inner face is parallel with the beveled portion of the drawing-ring $d^{14}$, means for supporting the can, means for giving said die-block $d^{13}$ vertical motion to and from the can and means for giving said dies $c^7$ horizontal motion to and from the can, substantially as described.

14. In a machine of the class specified jaws $c$ sliding in the converging channels of a chuck $C'$ and carrying dies $c^7$ with means for giving said jaws reciprocating horizontal motion, consisting of the levers $c^2$ engaging said jaws and pivoted in the body of the chuck and having rollers at their lower ends resting against the cam $c^4$ in combination with the quadruple cam $c^4$ sliding upon the sleeve $b^2$ guides $c^5$, and means for giving to said cam $c^4$ vertical reciprocating motion substantially as described.

15. In a machine of the class specified the die-holder $d'$ with means for raising and lowering the same, consisting of spring $d^2$, lever $d^4$ engaging a notch in the die-holder $d'$, adjusting-screw $d^6$, lifting-rod $d^7$, lever $d^8$, adjusting-screw $d^9$, cam $c^4$, having a projection $d^{12}$ engaging said lever $d^8$ and means for giving said cam $c^4$ vertically-reciprocating motion, substantially as described.

16. In a machine of the class specified the die-holder $d'$ with means for depressing the same, consisting of the lever $d^4$ engaging a notch in said die-holder and means for operating said lever consisting of the vertically-reciprocating cam $c^4$ having a projection $d^{12}$, lever $d^8$ engaged by the projection in said cam $c^4$, and lifting-rod $d^7$ resting upon said lever $d^8$, in combination with means for regulating the position of the die-holder and the extent of vertical motion of the same, consisting of an adjusting-screw $d^6$ in the end of the lever $d^4$ resting upon the top of the lifting-rod $d^7$, and an adjusting-screw $d^9$, supporting the free end of the lever $d^8$, substantially as described.

17. In a machine of the class specified the dies $c^7$ with means for giving the same horizontal motion toward the seam of the can, acting in conjunction with the drawing-ring $d^{14}$ and yielding die $d^{15}$ and means for giving said drawing-ring and yielding die vertical motion, the relative movements of said drawing-ring and dies being such that they shall coöperate in turning the projecting flange of the can-cover under and around the horizontally-projecting flange of the can-body, and crushing said flanges together, at the same time bending the interlocked flanges downward at an angle with the side of the can, substantially as described.

18. In a machine of the class specified dies $c^7$ acting in conjunction with yielding die $d^{15}$ and drawing-ring $d^{14}$ in turning the flange of the can-cover under and around the flange of the can-body and bending and crushing the interlocking edges of said flanges together, with means for operating said dies and drawing-ring simultaneously, consisting of the vertically-reciprocating cam $c^4$ acting upon levers $c^2$ pivoted to the jaws $c$ carrying the dies $c^7$, in combination with lever $d^8$ operated by the projection $d^{12}$ upon said cam $c^4$ and means for communicating the motion of said lever $d^8$ to the die-block $d^7$, substantially as described.

19. In a machine of the class specified means for turning the flange of the can-cover under and around the flange of the can-body and crushing the interlocking edges together at an angle of about forty-five degrees with the side of the can consisting of the dies $c^7$ yielding die $d^{15}$ and drawing-ring $d^{14}$ with means for operating said dies and drawing-ring, in combination with means for crushing the seam so formed flat against the body of the can, consisting of dies $c^8$ and $d^{20}$ and means for operating said dies substantially as described.

20. In a machine of the class specified, means for turning the flange of the can-cover under and around the flange of the can-body and crushing the interlocking edges together at an angle of about forty-five degrees with the side of the can consisting of the dies $c^7$, yielding die $d^{15}$ and drawing-ring $d^{14}$, with means for operating said dies and drawing-ring, in combination with means for crushing the seam so formed flat against the body of the can.

In testimony whereof I have hereunto subscribed my name in the presence of two witnesses.

CHARLES W. SLEEPER.

Witnesses:
MARION A. CUMMINGS,
NELLIE L. GOODALE.